Figure 1:
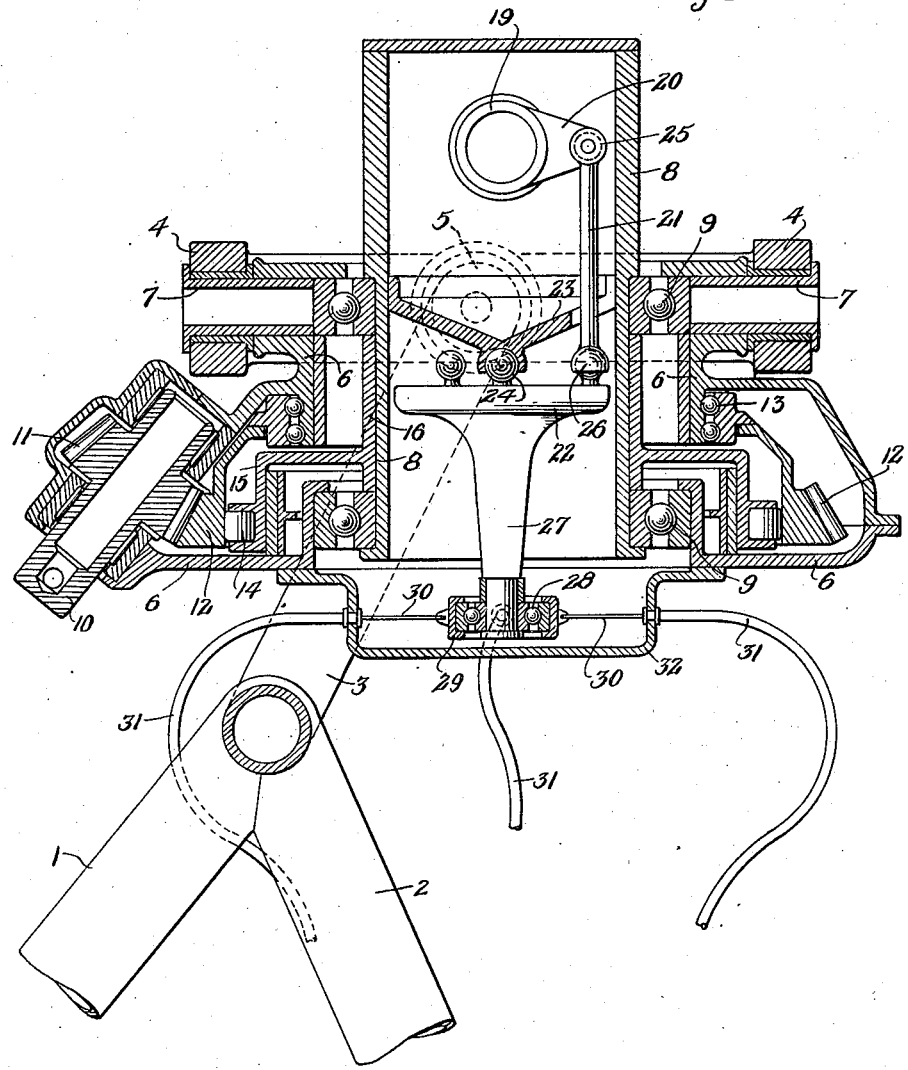

June 27, 1944.   H. F. PITCAIRN   2,352,404
SUSTAINING ROTOR FOR AIRCRAFT
Filed July 7, 1942

INVENTOR:
Harold F. Pitcairn
BY
ATTORNEYS.

Patented June 27, 1944

2,352,404

UNITED STATES PATENT OFFICE 2,352,404

SUSTAINING ROTOR FOR AIRCRAFT

Harold F. Pitcairn, Bryn Athyn, Pa., assignor to Autogiro Company of America, Philadelphia, Pa., a corporation of Delaware Application July 7, 1942, Serial No. 450,009

13 Claims. (Cl. 244—17)

This invention relates to sustaining rotors for aircraft. The invention, moreover, is especially concerned with a novel arrangement of the rotor hub and also with a novel rotor control system.

Certain control systems are already known for rotative winged aircraft. In accordance with one such system, the rotor hub is mounted for tilting movement as by a pilot's control stick, provision being made for tilting the hub in all directions so that the aircraft may be controlled both laterally and longitudinally. In another known system of control, periodic differential changes of blade pitch are employed, the pitch change mechanism again being coupled with a pilot's control stick or equivalent control organ. In either of these two systems, the actual control moment is set up as a result of an angular shift of the rotor lift line with respect to the center of gravity of the aircraft. Examples of these types of rotor control appear in copending applications of Juan de la Cierva, Serial No. 645,985, filed December 6, 1932, and Serial No. 698,372, filed November 16, 1933, which correspond to British Patents No. 393,976 and No. 410,532.

According to the present invention, the rotor hub is mounted for tilting movement in all directions, the arrangement being such as to provide for free floating of the rotor hub on the tilting mounting, so that the position of the hub and thus of the rotor as a whole may change in accordance with various operating conditions. At the same time, the invention contemplates employment of periodic differential pitch change of the blades with respect to the free floating hub, the pitch change mechanism being coupled with the pilot's control stick and providing for both lateral and longitudinal control of the aircraft.

Although this arrangement of hub and rotor control incorporates some features similar to both of the former known types referred to above, since the rotor hub, in accordance with the present invention, is full or free floating on the tilting mount, the functioning of the system is quite different from either of the former known systems. For instance, instead of manually tilting the hub, the present invention utilizes periodic differential pitch change to cause the hub to tilt to a new position. In a sense, therefore, the differential pitch control acts as a servo-means for tilting the hub, the control moments being secured, in turn, by the hub tilting.

Another fundamentally different feature of operation is as follows:

It is contemplated that the blades shall be connected with the hub by means of flapping pivots which are radially offset from the axis of rotation of the hub. This creates a force causing the hub always to follow movements of the blades. Because of the combination of the offset of the flapping pivots and the freely floating hub, the hub will automatically and very quickly follow changes in the mean rotative path of travel of the blades, which action is not possible with prior arrangements.

According to the invention, it is of advantage to employ tilting trunnions for mounting the hub providing longitudinal and transverse tilting axes, at least the latter of which is offset from the axis of the hub forwardly thereof. This serves to reduce and under certain conditions to eliminate blade flapping with respect to the hub during translational flight.

How the foregoing objects and advantages are attained, together with others which will occur to those skilled in the art, will appear more fully from the following description referring to the accompanying drawing, in which—

Figure 2:
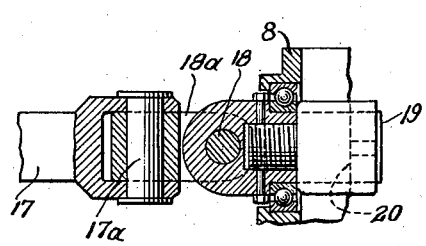

Figure 1 is a vertical sectional view through a rotor hub and its mounting in acordance with the invention; and Figure 2 is a fragmentary vertical sectional view illustrating the root end mounting of one of the blades on the hub.

The hub is adapted to be supported above the body of the aircraft by structural elements, such as the pylon legs indicated at 1—2. These pylon legs serve to support a yoke, the prongs 3 of which extend upwardly one at each side of the rotor hub. A gimbal ring 4 is mounted between the upper ends of prongs 3, being pivotally connected therewith as by a pair of tilting trunnions one of which is indicated at 5. These trunnions provide freedom for tilting movement of the ring in a fore and aft plane, the front of the machine being toward the left of Figure 1. A non-rotative hub support 6 is pivotally mounted within the gimbal ring 4 by means of a pair of trunnions 7—7 providing a longitudinal axis for lateral tilting movement of the hub. The axes of trunnions 5 and 7, therefore, provide freedom for tilting of the hub in all directions. The rotative hub part 8 is journaled within the non-rotative part 6 by means of bearings 9—9. The blades are connected with the upper extension of the rotative hub part 8 in the manner described hereinafter. It is here mentioned, however, that the hub part 8 and thus the rotor may be driven from shaft 10 carrying a pinion 11 meshing with ring gear 12, the ring gear being rotatably mounted by a bearing 13. The torque is transmitted to the hub through overrunning clutch rollers 14 which cooperate with the drum 15, which drum is rigid with sleeve 16 keyed or otherwise secured to the hub 8.

In connection with the drive mechanism, it is noted that in the case of an aircraft in which the rotor is normally adapted to be autorotated in flight, the drive would ordinarily be used only for the purpose of starting the rotor on the ground prior to effecting take-off. In the case of a helicopter or similar machine, in which the rotor is normally power driven in flight, the drive mechanism described will normally be in operation. In either event, it is contemplated that a manually disconnectible clutch (not shown) would be incorporated in the drive transmission, for instance, in shafting coupled with pinion shaft 10. In either type of aircraft, the provision of the over-running clutch 14 is of advantage to ensure free over-running and autorotation of the rotor, at least for the purposes of descent without power.

Turning now to the attachment of the blades to the hub, it is first noted that a three bladed rotor is herein illustrated. The root end of one blade appears in Figure 2, being identified by the numeral 17. A drag pivot 17a serves to couple the root end of the blade with the extension link 18a, this link, in turn, being coupled by means of the flapping pivot 18 with the part 19 which projects through an aperture in the wall of the hub, this part being journaled so as to provide freedom for movement of the blade about its own longitudinal axis. This is employed for change of blade pitch in the manner now to be described. Each blade mounting part 19 carries an arm 20 interiorly of the hub, the arm being coupled by means of link 21 with a swash member 22. The swash member is carried internally of the hub by a spider 23 and a universal joint 24 providing freedom for tilting movement of the swash member in all directions.

Links 21 are provided with ball joints 25 and 26 at the upper and lower ends thereof so as to accommodate various tilting movements of the swash member and yet transmit the vertical forces required to change the blade pitch through arms 20.

The swash member may be tilted through its stem 27 which projects downwardly therefrom and carries a bearing 28 serving to mount the non-rotative ring 29. A set of four Bowden control cables are employed for controlling the position of the swash member. Each of these cables (30) is connected with the non-rotative ring 29 and each is housed in a flexible tube 31, one end of which is fixed in member 32 carried at the under side of the hub. The lower ends of the several Bowden control cables are appropriately coupled with control means, for instance, a control stick, and the cables are arranged in pairs at right angles to each other so that upon tilting movement of the control stick in any direction a corresponding movement is transmitted to the swash member 22.

With a hub arrangement of the character above described, the offset of the flapping pivots for the blades from the axis of the hub sets up forces causing tilting movement of the hub in accordance with changes in the mean plane of rotation of the blades, the result being that the hub automatically assumes different planes of rotation, depending upon the forces acting on the blades at any particular time.

While I have illustrated and described a rotor incorporating at least three blades and believe this to be important for the above purpose, I do not wish to be limited in this respect, as the invention in its broad aspects may be applicable to rotors having less than three blades.

As shown in the drawing, the axis of the hub tilting fulcrums 5 is offset forwardly from the rotational axis of the hub, and also below the plane of the flapping pivots for the blades, this being for the purpose of setting up forces tending to maintain rotation of the rotor and of the hub in an appropriate position during translational flight. The degree of offset of fulcrums 5 (both forwardly and downwardly) may be such that the desired average rotor position is maintained during normal translational flight speed of the particular aircraft. The effect of the forward offset of fulcrums 5 is to reduce or eliminate under certain conditions, flapping of the blades with respect to the hub during translational flight, which will reduce or eliminate an oscillatory motion of the rotor during translational flight.

The system of pitch control is provided for the purpose of maneuvering the aircraft. The effect of the periodic differential changes of blade pitch which are set up upon actuation of the control is to cause the rotor blades and the hub to rotate in a different position, thereby shifting the lift line of the rotor with respect to the center of gravity of the aircraft. This introduces control movements and is preferably employed both for lateral and longitudinal control.

The sense of the control hook-up for differential pitch change desirably conforms with that disclosed in copending application of Juan de la Cierva, Serial No. 698,372, filed November 16, 1933. Briefly, in accordance with that hook-up, when the control stick or equivalent control organ is displaced forwardly, a nose-down moment is desired. This is achieved by differential pitch change in a sense such that the pitch of the blades as they pass on the advancing side of the rotor is reduced, and the pitch of the blades on the retreating side of the rotor is increased. Pitch change in the opposite sense takes place upon rearward movement of the control stick. Moreover, the lateral control operates in a similar manner, the sense of pitch change accompanying lateral movement of the control stick to the left or to the right depending upon the direction of rotation of the rotor, the points of maximum and minimum pitch for lateral control being reached when the blades pass the front and the rear of the machine.

In accordance with the present invention, it is contemplated that the axis of the tilting trunnions 7—7, providing for lateral tilting of the rotor, may also be offset somewhat from the rotational axis of the hub, the direction of this offset preferably being toward that side on which the blades retreat during translational flight. Moreover, the axis of trunnions 7—7 is desirably located below the plane of the blade pivots. The degree of offset in both senses (and also the degree of offset of tilting trunnions 5) will depend somewhat on the characteristics of the particular aircraft and rotor. As brought out in copending application of Juan de la Cierva, Serial No. 645,985, filed December 6, 1932, translational flight of an aircraft having a pivoted wing rotor causes the lift line of the rotor to angularly shift forwardly and somewhat toward the retreating side of the rotor. The direction of offset of both of the tilting fulcrums is preferably the same as the direction of shift of the lift line, and the degree of offset is desirably such that the tilting axes lie on or close to the lift line at the normal cruising speed of the aircraft.

Structurally, the rotor hub arrangement above described is of advantage for a number of reasons, one point of importance being that the introduction of the mechanism for periodically varying the blade pitch angle is achieved with a minimum of complication, notwithstanding the fact that the hub is free to float in all directions. The extension of the blade mounting members 19 through the hub wall to a point interiorly of the hub contributes to this advantage, since the pitch control connections, except for the cables extending down to the body, may all be arranged within the hub itself.

I claim:

1. For an aircraft, a sustaining rotor comprising a hub and a plurality of blades, each blade being pivotally connected with the hub on a flapping axis offset from the rotational axis and providing freedom for swinging movement of the blade in a direction generally transverse the mean rotative path of travel of the blades, means mounting the hub for tilting movement in at least one plane about an axis offset from the rotational axis of the hub to provide for free floating to and rotation in different planes, and mechanism for controlling the plane of rotation of the rotor and thereby the position of the lift line comprising controllable means for effecting periodic differential variation of pitch angle of the blades with respect to the floating hub, said controllable means having means of connection to the blades constructed to effect a substantially given differential pitch variation (with reference to the hub), with a given control adjustment, regardless of the plane of rotation of the hub.

2. A construction in accordance with claim 1 in which the axis for free tilting of the hub is an axis disposed generally transverse the aircraft and offset forwardly from the rotor axis.

3. A construction in accordance with claim 1 in which the axis for free tilting of the hub is an axis disposed generally transverse the aircraft and offset forwardly from the rotor axis, said tilting axis further being disposed below the horizontal plane of the pivots by which the blades are connected with the hub.

4. For an aircraft, a sustaining rotor comprising a hub and a plurality of blades, each blade being pivotally connected with the hub on a flapping axis offset from the rotational axis and providing freedom for swinging movement of the blade in a direction generally transverse the mean rotative path of travel of the blades, means mounting the hub for tilting movement in all directions to provide for free floating to and rotation in different planes, said mounting means incorporating a tilting axis extended generally transverse the aircraft and offset forwardly of the rotational axis, and mechanism for controlling the plane of rotation of the rotor and thereby the position of the lift line comprising a controllably tiltable swash member mounted on said tiltable hub, and means of connection to the blades constructed to effect periodic differential blade pitch change upon adjustment of the swash member with reference to the tiltable hub.

5. For an aircraft, a sustaining rotor comprising a hub and a plurality of blades, each blade being connected with the hub by a pitch change mounting and by a flapping pivot operatively interposed between the blade and the pitch change mounting, said flapping pivot providing freedom for swinging movement of the blade in a direction generally transverse the mean rotative path of travel of the blades about an axis offset from the rotational axis of the hub, means mounting the hub for tilting movement in at least one plane to provide for free floating to and rotation in different planes, and mechanism for controlling the plane of rotation of the rotor and thereby the position of the lift line comprising a controllably tiltable swash member mounted on said tiltable hub, and means interconnecting said swash member and the blade inboard of said flapping pivot and constructed to effect periodic differential blade pitch change upon adjustment of the swash member with reference to the tiltable hub.

6. For an aircraft, a sustaining rotor comprising a hub and a plurality of blades, each blade being pivotally connected with the hub on a flapping axis offset from the rotational axis and providing freedom for swinging movement of the blade in a direction generally transverse the mean rotative path of travel of the blades, means mounting the hub for tilting movement in all directions to provide for free floating to and rotation in different planes, and mechanism for controlling the plane of rotation of the rotor and thereby the position of the lift line comprising controllable means for effecting periodic differential variation of the pitch angle of the blades with respect to the floating hub, said controllable means having means of connection to the blades constructed to effect a substantially given differential pitch variation (with reference to the hub), with a given control adjustment, regardless of the plane of rotation of the hub.

7. For an aircraft, a sustaining rotor comprising a hub and at least three blades, each blade being pivotally connected with the hub on a flapping axis offset from the rotational axis and providing freedom for swinging movement of the blade in a direction generally transverse the mean rotative path of travel of the blades, means mounting the hub for tilting movement in all directions to provide for free floating to and rotation in different planes, and mechanism for controlling the plane of rotation of the rotor and thereby the position of the lift line comprising a controllably tiltable swash member mounted on said tiltable hub, and means of connection to the blades adapted to effect periodic differential blade pitch change upon adjustment of the swash member with reference to the tiltable hub.

8. A construction in accordance with claim 7 in which the mounting means for the hub provides a center point for hub tilting located below the horizontal plane of the blade pivots.

9. For an aircraft, a sustaining rotor comprising a hub and at least three blades, each blade being pivotally connected with the hub on a flapping axis offset from the rotational axis and providing freedom for swinging movement of the blade in a direction generally transverse the mean rotative path of travel of the blades, means mounting the hub for tilting movement in at least one plane to provide for free floating to and rotation in different planes, and mechanism for controlling the plane of rotation of the rotor and thereby the position of the lift line comprising a controllably tiltable swash member mounted on said tiltable hub, and means of connection to the blades adapted to effect periodic differential blade pitch change upon adjustment of the swash member with reference to the tiltable hub.

10. A construction in accordance with claim 9 in which the tilting mounting provides for free floating of the hub in a fore and aft plane.

11. For an aircraft, a sustaining rotor comprising a hub and a plurality of blades, each blade being pivotally connected with the hub on a flapping axis offset from the rotational axis and providing freedom for swinging movement of the blade in a direction generally transverse the mean rotative path of travel of the blades, means mounting the hub for tilting movement in all directions to provide for free floating to and rotation in different planes, and means for changing the plane of rotation of the rotor and thereby the position of the lift line comprising means for controllably imposing upon the blades a periodic differential variation of their pitch with respect to the floating hub.

12. In an aircraft, a bladed sustaining rotor having means of compensation for differential lift effects in translational flight, said rotor including a rotor axis member, a controllable pitch-changing system adapted to effect cyclic blade pitch change in synchronism with the rotational period of the rotor to control the rotor thrust line position, a pivotal mounting constructed to provide for normally free-floating tilting movement of the rotor axis member to various positions according to and under the influence of different flight conditions, and rotor-tilt accommodating means incorporated in said pitch-changing system and adapted inherently to prevent appreciable disturbance of a given pitch control condition by the free-floating movements of the rotor axis member upon its pivotal mounting.

13. In an aircraft, a bladed sustaining rotor having means of compensation for differential lift effects in translational flight, said rotor including a rotor axis member, a controllable pitch-changing system adapted to effect cyclic blade pitch change in synchronism with the rotational period of the rotor to control the rotor thrust line position, a universal pivotal mounting constructed to provide for tilting movement of the rotor axis member in any direction and to various positions according to different flight conditions, and rotor-tilt accommodating means incorporated in said pitch-changing system and adapted inherently to prevent appreciable disturbance of a given pitch control condition by the movement of the rotor axis member in any direction upon its pivotal mounting.

HAROLD F. PITCAIRN.

CERTIFICATE OF CORRECTION.

Patent No. 2,352,404. June 27, 1944.

HAROLD F. PITCAIRN.

It is hereby certified that error appears in the printed specification of the above numbered patent requiring correction as follows: Page 2, second column, line 32, for the word "movements" read --moments--; and that the said Letters Patent should be read with this correction therein that the same may conform to the record of the case in the Patent Office.

Signed and sealed this 15th day of August, A. D. 1944.

Leslie Frazer (Seal) Acting Commissioner of Patents.